(12) United States Patent
Mao

(10) Patent No.: US 6,824,095 B2
(45) Date of Patent: Nov. 30, 2004

(54) VSTOL VEHICLE

(76) Inventor: Youbin Mao, 430 N. Holliston Ave. #210, Pasadena, CA (US) 91106

( * ) Notice: Subject to any disclaimer, the term of this patent is extended or adjusted under 35 U.S.C. 154(b) by 0 days.

(21) Appl. No.: 10/757,482

(22) Filed: Jan. 15, 2004

(65) Prior Publication Data

US 2004/0144890 A1 Jul. 29, 2004

Related U.S. Application Data

(63) Continuation-in-part of application No. 10/012,135, filed on Nov. 29, 2001, now abandoned.

(51) Int. Cl.$^7$ ............................................ B64C 29/04
(52) U.S. Cl. ..................... 244/12.5; 244/2; 244/23 D
(58) Field of Search ......................... 244/2, 12.5, 12.2, 244/23 C, 23 D, 103 S, 106

(56) References Cited

U.S. PATENT DOCUMENTS

| | | | |
|---|---|---|---|
| 3,335,977 A | 8/1967 | Meditz | |
| 5,115,996 A | 5/1992 | Moller | |
| 5,890,441 A | 4/1999 | Swinson | |
| 6,254,032 B1 * | 7/2001 | Bucher | 244/12.2 |
| 6,464,166 B1 * | 10/2002 | Yoeli | 244/12.1 |
| 6,568,630 B2 * | 5/2003 | Yoeli | 244/23 R |

* cited by examiner

*Primary Examiner*—Peter M. Poon
*Assistant Examiner*—Tim D Collins

(57) ABSTRACT

A VSTOL vehicle including a fuselage with two pairs of ducted rotors fully enclosed fore and aft of the fuselage respectively. The fuselage is aerodynamically shaped to generate lift in forward flight. All four ducts are configured such that their center axes are at angles tilted sufficiently forward from the vertical axis of the fuselage. Each ducted rotor is powered by one engine inside the duct behind the rotor. All four rotors and engine shafts rotates counterclockwise, generating substantial angular momentum for gyroscopic effect. Variable inlets of the ducted rotors and vector thrusting of the airflow out of the ducted rotors combine to provide efficient power and control during all phases of flight. The vehicle is configured to meet motor vehicle requirements to drive on streets.

14 Claims, 3 Drawing Sheets

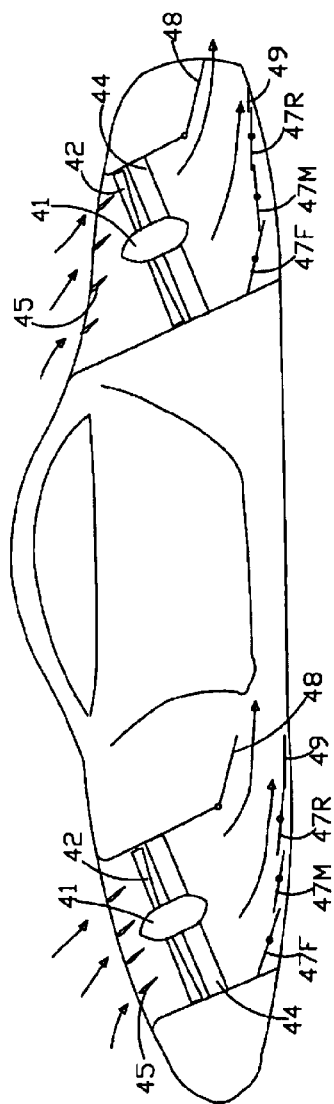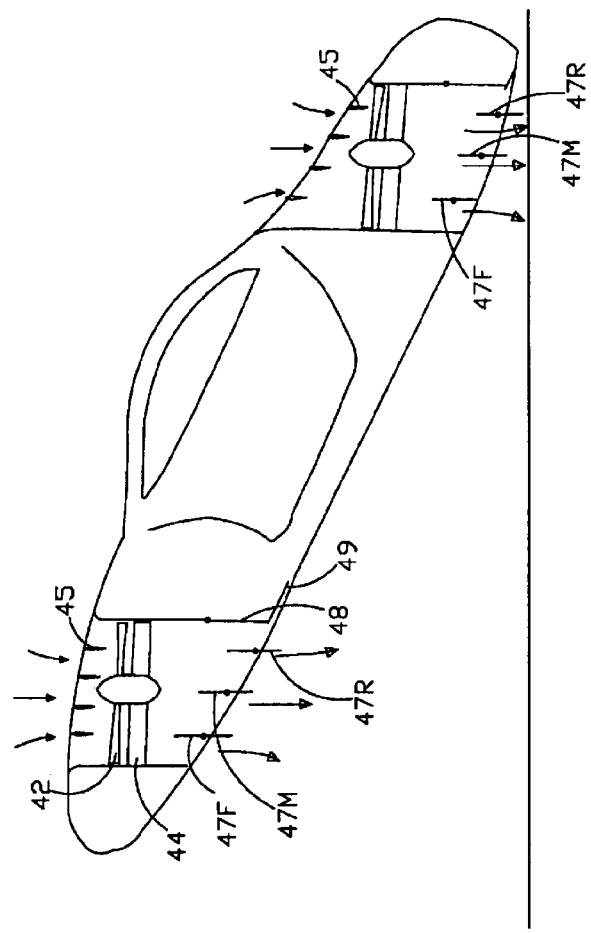
Fig. 2a
Fig. 2b

VSTOL VEHICLE

The present application is a Continuation in Part of application Ser. No. 10/012,135, filed Nov. 29, 2001, now abandoned.

FEDERALLY SPONSORED RESEARCH

Not Applicable

SEQUENCE LISTING OR PROGRAM

Not Applicable

BACKGROUND

1. Field of Invention

This invention relates generally to vertical and short takeoff and landing (VSTOL) vehicle, specifically to an improved VSTOL vehicle that is stable and capable of high speed cruise with ducted rotors wherein the ducts remain stationary and at angles between the vertical and longitudinal axes of the vehicle, and the thrusts from the ducted rotors are adjustable and vectored.

2. Description of Prior Art

Ducted rotors, also known as ducted fans, are more efficient and quieter than exposed propellers of the same diameters. They are also safer than exposed propellers on the ground.

Several designs have involved ducted rotors to achieve VSTOL with high-speed cruise capability. The designs have included separate fans for vertical and horizontal thrust (see U.S. Pat. No. 5,890,441); ducted fans mounted in the fixed wings which rotate from horizontal to vertical (see U.S. Pat. No. 3,335,977). These designs suffer from inefficient redundancy, or heavy and complex mechanism that is prone to failure, particularly during transition from hover to flight and vice versa.

A more recent design has four ducted fans fixed on both sides of the fuselage and mounted parallel to the longitudinal axis of the fuselage, with exit vanes in each ducted fan to redirect airflow for vertical takeoff and landing (see U.S. Pat. No. 5,115,996). The design was intended to achieve efficient high-speed cruise. On closer look, however, such compromise makes vertical take-off inefficient as ninety degree thrust vectoring during takeoff causes significant power loss just when the thrust and power are most needed. Thus bigger ducted fans and more powerful engines are required, which actually produces more drag at high-speed cruise. Four big fans drawing in air from the front also pose significant safety hazard on the ground. Noise can easily escape from both the front and aft ends of the ducts. Stability control during transition from hovering to forward flight can also be very challenging.

Yet another recent design example is the DuoTrek by Millennium Jet Inc., which has four shallow (depth of the duct substantially smaller than the rotor diameter) ducted fans mounted horizontally on both sides of the fuselage. The design has only a very moderate top speed, as the horizontally mounted and shallow ducted fans are not efficient for high-speed cruise. Noise level will also be necessarily high as the ducts are too shallow to provide much shield.

OBJECTS AND ADVANTAGES

Therefore several objects and advantages of the present invention are:

(a) to provide a VSTOL design that presents a better compromise between the conflicting requirements of vertical take off and high speed cruise.

(b) to provide a VSTOL design that is inherently more stable and easier to control during all phases of flight, particularly during the transition between hover and forward flight which has been particularly challenging to previous designs.

(c) to provide a VSTOL design that takes full advantage of the potential benefits of ducted rotors;

(d) to provide a VSTOL design that is more efficient in reducing drag and power requirements during all phases of flight.

(e) to provide a VSTOL design that is safe with multiple measures for emergency landing.

(f) to provide a VSTOL design that is quiet.

(g) to provide a VSTOL design that is compact, versatile and capable of multiple use, including meeting motor vehicle requirements to drive on local streets and highways;

(h) to provide a VSTOL design that is capable of flying close to ground much as a hovercraft to take advantage of the ground effect.

Still further objects and advantages will become apparent from a consideration of the ensuing description and drawings.

SUMMARY

In accordance with the present invention, a preferred embodiment includes a fuselage with two pairs of ducted rotors fully enclosed fore and aft of the fuselage respectively, and two vertical stabilizers attached to the fuselage. The fuselage is configured to generate aerodynamic lift in forward flight. All four ducts are configured such that their center axes are at angles tilted sufficiently forward from the vertical axis of the fuselage. Each ducted rotor is powered by one engine inside the duct behind the rotor.

In the preferred embodiment of the present invention, all four rotors and engine shafts rotate counterclockwise, generating substantial angular momentum with gyroscopic effect. Variable-shape inlets of the ducted rotors and vector thrusting of the airflow out of the ducted rotors combine to provide efficient power and control during vertical flight.

DRAWINGS

Brief Description of the Drawings

In the drawings, closely related figures have the same number but different alphabetic suffixes.

FIG. 2a is a side cross-section view showing relative location and angles of the fuselage and the ducted rotor assemblies during typical horizontal flight.

FIG. 2b is a side cross-section view showing relative location and angles of the fuselage and the ducted rotor assemblies in reference to the ground during initial vertical takeoff and in reference to the horizon during vertical flight of the vehicle.

REFERENCE NUMERALS IN DRAWINGS

Figure 1:
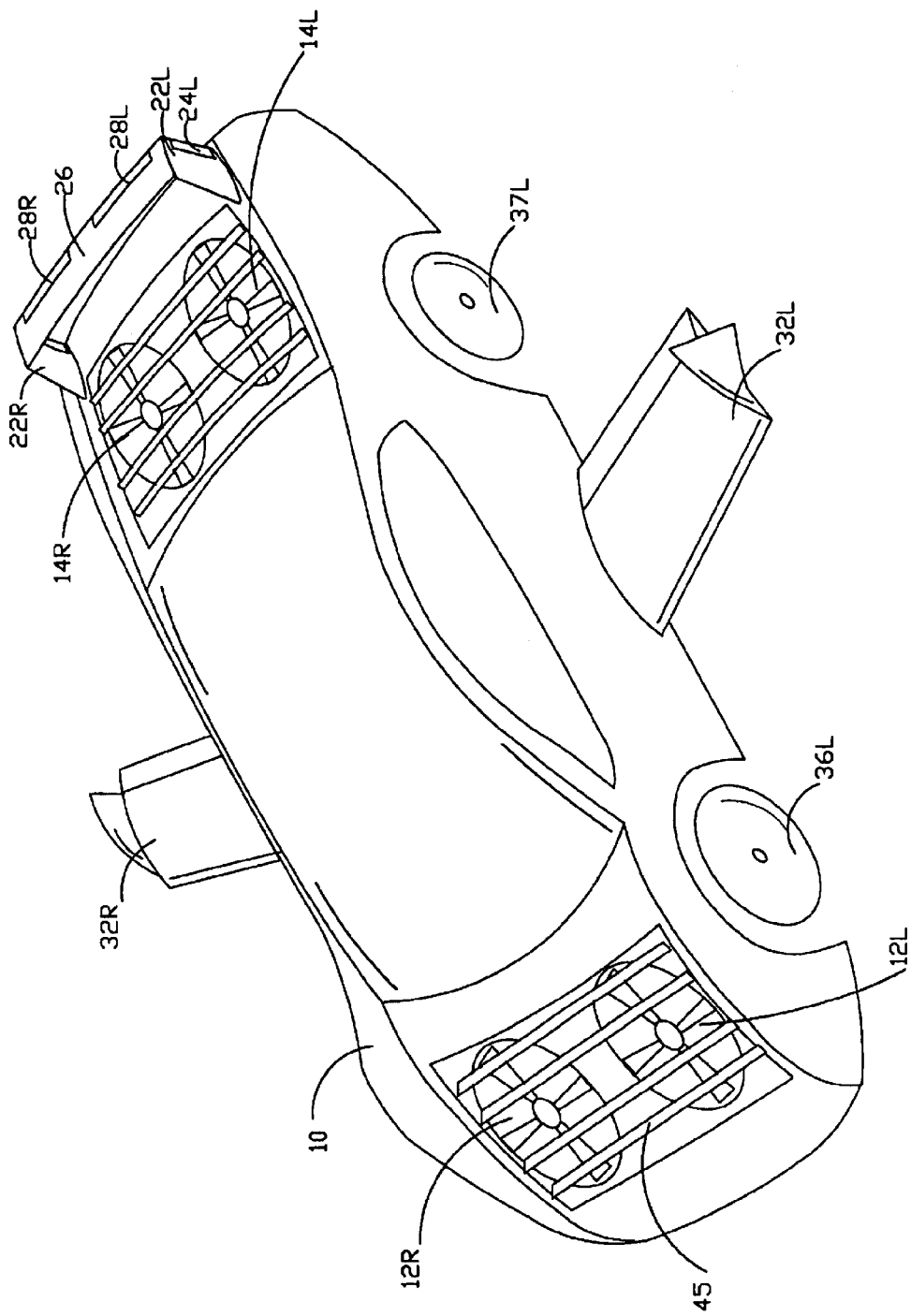
FIG. 1 is a perspective view of a VSTOL vehicle in preferred embodiment in accordance with the present invention.

| Reference Numerals In Drawings | |
| --- | --- |
| 10 fuselage | 12 front ducted rotor assembly |
| 14 rear ducted rotor assembly | |
| 22 vertical stabilizer | 24 rudder |
| 26 horizontal stabilizer | 28 elevator |
| 32 retractable wing | |
| 36 front wheel | 37 rear wheel |
| 41 engine | |
| 42 rotor | 44 stators |
| 45 inlet louvers | |
| 47 exit vane | 48 airflow flap |
| 49 airflow guide | |

DETAILED DESCRIPTION OF THE PREFERRED EMBODIMENT

FIG. 1 shows a perspective view of a VSTOL vehicle in the preferred embodiment of the present invention. The preferred embodiment includes an elongated fuselage 10 shaped to produce lift during forward flight, with four ducted rotor assemblies 12L, 12R, 14L, 14R fully enclosed inside the fuselage. Two of the ducted rotor assemblies 12L and 12R are located in the fore of fuselage 10 and forward of the center of gravity of the fuselage, and the other two ducted rotor assemblies 14L and 14R are located in the aft of the fuselage 10 rearward of the center of gravity of the fuselage. Two vertical stabilizers 22L and 22R are respectively attached to and rise from the left and right edges of the rear end of the fuselage 10. Two rudders 24L and 24R are respectively mounted to the rear edges of the two vertical stabilizers 22L and 22R. One horizontal stabilizer 26 is bridged between the top edges of the two vertical stabilizers 22L and 22R, with elevators 28L and 28R mounted to the left and right sides of the rear edge of the horizontal stabilizer 26. A pair of retractable wings 32L and 32R (shown in open position) is hidden underneath the cockpit when not in use.

As illustrated in FIG. 2a, in the horizontal flight mode, the inlets of the ducts are already at an angle to the incoming air stream. In the preferred embodiment, the ducts are installed such that their center axes are at an angle about 30 degrees forward of the vertical axis of the fuselage. (It should be noted that in other significant alternative configurations, the installed angles of the ducts could be different from each other; See section on Additional Embodiments.) The exiting air is redirected to almost fully backward through the exit vanes 47 in each ducted rotor assembly.

FIG. 2b shows the operation of the vehicle in the vertical takeoff or vertical flight mode. The vehicle initially rests on front and rear wheels 36 and 37 (Shown in FIG. 1). To start the vertical takeoff, the exit vanes 47 in the front pair of ducted rotor assemblies 12L and 12R are configured to produce substantial thrust, which lifts the front portion of the vehicle and rotates around the rear wheels 37, until the longitudinal axis of the fuselage points about 30 degree above horizon, and all four ducted rotor assemblies thrust the airflow straight downward. With all four ducted rotor assemblies in full power mode, the vehicle lifts off.

The detailed structure of a ducted rotor assembly can also be seen in FIGS. 2a and 2b. The present invention requires a "deeply" ducted rotor configuration such that the axial length of the duct is at least half of the diameter of the rotor. Some previous designs employ only a shallow shroud around the rotor. Such configuration is commonly referred to as shrouded fan, in the art. The more elongated duct in the present invention would allow the incoming air more time to accelerate smoothly and become more evenly distributed when it reaches the rotor, which results in efficient operations at a wide range of cruise speeds.

The cross section of the duct has a rectangular shape at the inlet, and gradually turns into circular shape at the rotor. After that it gradually turns rectangular again for effective thrust control by the exit vanes 47. The cross section area of the duct should be gradually and smoothly reduced from the inlet to the rotor, so the inflow air can be smoothly accelerated toward the rotor without separation.

The engine 41 could be of Wenkel rotary type for the following reasons: A rotary engine is more reliable because it has far fewer moving parts than a piston engine. It can also be made more compact than piston engines of the same power. Unlike a piston that rapidly and violently changes direction, the rotor in a rotary engine spins in the same direction, resulting in smoother and quieter operation, as well as more angular momentum for the attitude stability control in the present invention. Each rotor assembly has a number of rotor blades 42, and a number of stators 44 behind the rotor blades. The tips of the rotor blades must be very close to the duct wall for best efficiency. The number of stators is different from the number of rotor blades to reduce vibration. The rotor blades are strengthened at the tips to maximize angular momentum generated as well as to store significant kinetic energy to be released in controlled manner during vertical takeoff or emergency landing. The heavier blades also lead to smoother rotation and reduced noise level. The stators have cross sections of airfoil shape and are angled to substantially straighten the airflow that is slightly swirling coming out of the rotor blades. The stators not only convert the swirling energy of the airflow into straight kinetic energy that produces thrust, they also cancel out the torque exerted on the rotor blades by the airflow.

The inlet has a number of movable louvers 45. The duct exit comprises of three movable exit vanes—front vane 47F, middle vane 47M, and the rear vane 47R, and airflow flap 48 and guide 49.

As shown in FIG. 2a, in the forward flight mode, the inlet louvers 45 tilt forward to guide the incoming air toward the rotor 42. Properly angled, the inlet louvers can minimize the airflow separation around the inlet area during forward flight. The exit vanes 47 are fully extended forward with the airflow flap 48 open to direct all airflow backward.

Refer to FIG. 2b for the operation of the ducted rotor assembly in vertical takeoff and vertical flight mode. The inlet louvers 45 are fully opened to draw in more air, which improves the static thrust. Even the surface area around the inlet now has a lower static air pressure as the air moves toward the inlet, generating additional lift that is not realized by designs with exposed ducts or ducts installed horizontally. The inlet louvers 45 are lined in parallel to the duct wall to guide the air straight down toward the rotor 42. The airflow flap 48 is closed. The exit vanes 47 are positioned substantially parallel to the duct wall to guide the airflow straight down. Note that some airflow is intentionally directed towards the front and the rear by 47F and 47R in order to achieve thrust magnitude and direction control as shown in FIGS. 3a–3c.

In the vertical takeoff and vertical flight mode, the control surfaces of the rudders and elevators are ineffective. In the preferred embodiment, all rotor blades have variable pitch angles that can be adjusted to produce different levels of thrust. Another reason for variable pitch is so that the kinetic energy stored in the rotors can be released in controlled fashion by gradually increasing the pitch angles as the rotors slowing down. The exit vanes also serve as effective means of thrust control and vectoring.

Figure 3C:
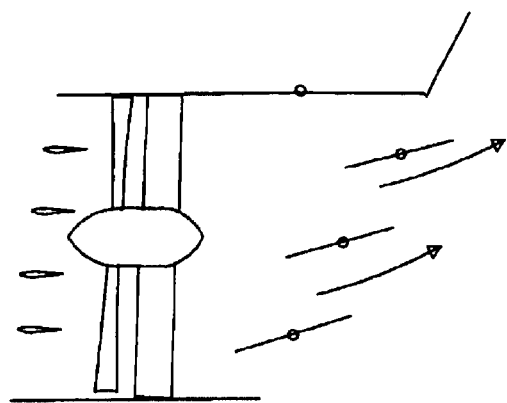
FIGS. 3a–3c illustrates the control of the magnitude and direction of the thrust of one ducted rotor assembly through the exit vanes.
Figure 3B:
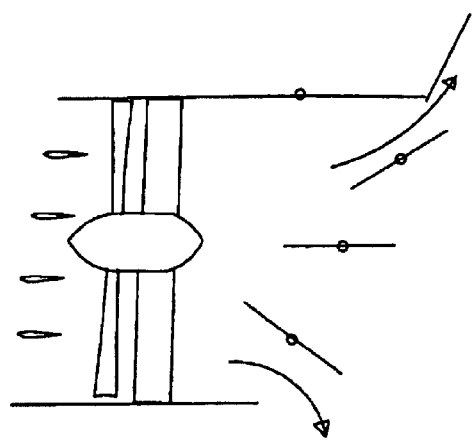
Figure 3A:
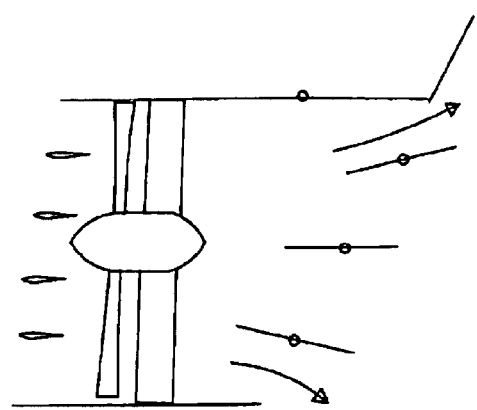

As shown in FIGS. 3a–3c, the thrust magnitude and direction of a ducted rotor assembly can be effectively controlled by varying the positions of the exit vanes 47F, 47M and 47R.

FIG. 3a illustrates the exit vanes in the neutral position, with 47F and 47R partially redirecting airflow to the front and the back. As shown in FIG. 3b, when 47F and 47R are turned to direct even more air to the front and the back, the net vertical thrust is reduced. To increase the net vertical thrust, 47F and 47R should be turned toward vertical position. FIG. 3c shows 47F, 47M and 47R all turn to direct air partially to the back to produce a thrust forward. Note that the angles in FIGS. 3a–3c are exaggerated for better illustrations.

Noting that the present invention utilizes the high angular momentum generated by the rotor assemblies to enhance stability through the gyroscopic effect, thus in hover mode the pitch and roll controls of the vehicle are a bit similar to those of a helicopter. For example, to pitch forward, a net torque towards the front must be applied. During vertical takeoff and hovering, this is achieved by increasing the vertical thrusts of the two ducted rotor assemblies on the left side (12L and 14L) while reducing the vertical thrusts of the two ducted rotor assemblies on the right side (12R and 14R). The roll control is similarly achieved by using differential vertical thrusts produced by the front pair of ducted rotor assemblies (12L and 12R) and the rear pair of ducted rotor assemblies (14L and 14R). The yaw control is realized by differentially thrust vectoring forward or backward the two ducted rotor assemblies on the left side (12L and 14L) while thrust vectoring in the opposite direction for the two ducted rotor assemblies on the right side (12R and 14R). During full forward flight, all thrusts are directed fully backward, making the attitude control through the thrust vectoring ineffective. Thus attitude control is realized through the conventional control surfaces—the rudders 24L, 24R and the elevators 28L and 28R, in forward flight.

The vehicle is also capable of short take off and landing with the conventional control.

The rotor shafts of all four ducted rotor assemblies are connected by a transmission mechanism such that if one or two engines fail, the remaining engines can still provide enough power for safe landing.

With the retractable wings 32 opened up, the vehicle can extend its cruise range, or stay in the air longer. It can also fly close to the ground to take advantage of the ground effect, with the bottom sides of the vehicle and the extended wings providing good air cushion.

The vehicle is designed to float on water, particularly for emergency landing and takeoff.

Advantages

From the description above, a number of advantages of the present invention become evident:

(a) The present invention provides an optimal compromise between the conflicting requirements of vertical takeoff and high-speed cruise. The required maximum engine power of a VSTOL vehicle is determined by the power needed for vertical takeoff. The present invention prevents power loss due to thrust vectoring during vertical takeoff as in some previous designs.

(b) The present invention provides an efficient VSTOL design. The reduced maximum engine power requirement leads to reduced weight of the power system and better fuel efficiency for cruise. Furthermore, without open propellers or exposed external ducts, the present design is more aerodynamic with much less drag, resulting in efficient high-speed cruise. The variable inlet design combined with the deeply embedded rotors allows the rotors to operate at very high efficiency in a wide range of speed. It also enables very high-speed cruise with the more powerful turbo jet engines. A turbo engine happens to provide very high angular momentum with the high rotation rate of its shaft.

(c) The present invention provides a stable and safe VSTOL design. The high angular momentum generated by the rotors and the engine shafts provides the vehicle with high stability margin through the gyroscopic effect. The high kinetic energy stored in the rotor blades can also be utilized for emergency landing. The power redundancy achieved by connecting the rotor shafts together with a transmission mechanism provides further safety measures against engine failure. In an unlikely event that one pair of ducted rotors fails altogether, the vehicle will still be able to fly with the remaining pair of rotors and land on a runway, particularly with the retractable wing open and with the help of the ground effect. And the vehicle can land on water, increasing the chance of a safe landing Without the need for big wings, and with an aerodynamic body, the vehicle is less susceptible to gust winds. A reliable control system is implemented on triple redundancy computers.

(d) The present invention provides a VSTOL design that is quieter than previous designs. The fuselage provides a better sound insulation than the nacelles of exposed ducted rotors can. The rotary engine and the heavier rotor blades lead to smoother and quieter operation. The deeply embedded rotors allow many active noise suppression technologies to apply. The air is drawn from the top of the fuselage during takeoff, rather than from the front like some other previous designs, resulting in further reduced noise levels.

(e) The present invention provides a VSTOL design that is safe on the ground, without any exposed propellers or nacelles, and without drawing in air from horizontal directions during takeoff.

(f) The present invention provides a VSTOL design that is compact, and can meet the motor vehicle requirements to drive on local streets and highways without much technical difficulties. The purpose is to allow the pilot to drive to and from a place for safe takeoff and landing.

Addition Embodiments

There are many additional embodiments that can demonstrate a variety of applications in accordance with the present invention.

(a) The vehicle in the preferred embodiment has all four ducts installed at the same angle, about 30 degrees forward from vertical. Such configuration generates the most thrust at hover, however, at the expense of efficiency in forward flight. One alternative embodiment calls for different installed angles for the front pair of ducted rotors from the installed angles for the rear pair. For example, if the front pair is installed at 15 degree forward from vertical, while the rear pair is at 45 degrees forward from vertical, then vertical takeoff and hover can still be achieved by raising the vehicle nose by about 30 degrees (exact angle depends on location of center of gravity). Without thrust vectoring, such design loses about 3 percent in combined thrust in vertical takeoff. However, it gains in a number of ways. First, full attitude control is now possible with only thrust magnitude control and without complex thrust vectoring mechanism: When the vehicle nose is raised 30 degrees, the horizontal thrust components of the front ducted rotor pair point backward, while the horizontal thrust components from the rear pair point forward. So the two diagonal pairs of ducted rotors produce yaw torques in opposite direction, thus yaw control can be realized simply by differential thrusts between the two diagonal pairs. Roll control is still achieved with differential thrusts of ducted rotors on the left and right side, while pitch control by differential thrusts between the front and rear pairs. Second, forward flight becomes more efficient as the aerodynamic lift makes thrusts from front rotors unnecessary, while at 45 degree from vertical, the rear pair of ducted rotors are much more efficient at producing forward thrust, particularly when their thrusts are vectored backward by the exiting vanes.

(b) The vehicle in the preferred embodiment has all four ducted rotors spin in the same direction to generate the most angular momentum for stability control. Alternatively, all rotors can be constructed with light weight composite materials; the left front and right rear rotors can spin in one direction, while the right front and left rear rotors spin in the opposite direction. Gyroscopic stability is lost because the net angular momentum is nominally at zero. On the positive side, control system design becomes easier, and the vehicle will be more agile.

Conclusion, Ramifications, and Scope

Thus it can be seen that the VSTOL vehicle of the present invention provides an efficient, stable, safe, quiet, compact, versatile yet practical design for many potential applications such as public transportation, search and rescue, and military operations.

While my above description contains much specificity, these should not be construed as limitations on the scope of the invention, but rather as an exemplification of one preferred embodiment thereof.

Accordingly, the scope of the invention should be determined not by the embodiments illustrated, but by the appended claims and their legal equivalents.

I claim:

1. A VSTOL vehicle comprising:

a fuselage shaped to develop aerodynamic lift in a horizontal flight;

a plurality of ducts, rigidly and non-pivotably connected to said fuselage, which are positioned around center of mass of said vehicle, and whose center axes are at various fixed angles between, but substantially different from, said vehicle's vertical and longitudinal axes, such that full three dimensional attitude control can be achieved with torques produced by varying thrusts from said ducts; each said duct having inside a rotor which rotates about the longitudinal axis of the duct to generate independent streams of airflow for propelling and stabilizing said vehicle, each said duct has a total axial length, as measured from the opening of the duct to its aft end where air flow exits, of at least more than half the diameter of the rotor inside said duct;

a plurality of power plants and transmission means for conveying the rotational energy from said power plants to the said rotors;

control means for coordinating the power generated by the power plants to maintain the balance and stability of said vehicle and to rotate and move said vehicle in any direction.

2. A VSTOL vehicle as in claim 1 further comprising means for generating and maintaining substantially high level of angular momentum whereby said vehicle is substantially stabilized through the gyroscopic effect.

3. A VSTOL vehicle as in claim 1 wherein said rotors and said power plants store substantially high level of kinetic energy whereby said vehicle can substantially utilizes the stored kinetic energy to assist takeoff and emergency landing.

4. A VSTOL vehicle as in claim 1 further comprising a plurality of wheels allowing said vehicle to drive on land and transmission means for conveying rotational power from said power plants to said wheels.

5. A VSTOL vehicle as in claim 1 further comprising a plurality of wings, and means for rotating said wings from a first position fully retracted under the fuselage to a second position fully extended whereby substantial upward lift is generated during forward flight.

6. A VSTOL vehicle as in claim 1 wherein the side and bottom of said vehicle is shaped to utilize the ground effect during takeoff, landing and hover mode near ground.

7. A VSTOL vehicle as in claim 1 wherein the shape and weight of said vehicle is designed to float on water, whereby said vehicle can take off and land on water surface.

8. A VSTOL vehicle comprising:

a fuselage shaped to develop aerodynamic lift in a horizontal flight;

two pairs of ducts, fully enclosed fore and aft of said fuselage respectively, rigidly and non-pivotably connected to said fuselage, which are positioned around center of mass of said vehicle, and whose center axes are at various fixed angles between, but substantially different from, said vehicle's vertical and longitudinal axes, such that full three dimensional attitude control can be achieved with torques produced by varying thrusts from said ducts; each said duct having inside a rotor which rotates about the longitudinal axis of the duct to generate independent streams of airflow for propelling and stabilizing said vehicle, each said duct has a total axial length, as measured from the opening of the duct to its aft end where air flow exits, of at least more than half the diameter of the rotor inside said duct;

a plurality of power plants and transmission means for conveying the rotational energy from said power plants to the said rotors;

control means for coordinating the power generated by the power plants to maintain the balance and stability of said vehicle and to rotate and move said vehicle in any direction.

9. A VSTOL vehicle as in claim 8 further comprising means for generating and maintaining substantially high level of angular momentum whereby said vehicle is substantially stabilized through the gyroscopic effect.

10. A VSTOL vehicle as in claim 8 wherein said rotors and said power plants store substantially high level of kinetic energy whereby said vehicle can substantially utilizes the stored kinetic energy to assist takeoff and emergency landing.

11. A VSTOL vehicle as in claim 8 further comprising a plurality of wheels allowing said vehicle to drive on land and transmission means for conveying rotational power from said power plants to said wheels.

12. A VSTOL vehicle as in claim 8 further comprising a plurality of wings, and means for rotating said wings from a first position fully retracted under the fuselage to a second position fully extended whereby substantial upward lift is generated during forward flight.

13. A VSTOL vehicle as in claim 8 wherein the side and bottom of said vehicle is shaped to utilize the ground effect during takeoff, landing and hover mode near ground.

14. A VSTOL vehicle as in claim 8 wherein the shape and weight of said vehicle is designed to float on water, whereby said vehicle can take off and land on water surface.

* * * * *